(No Model.)

A. J. HARDER.
DETACHABLE WATER FILTERING BED.

No. 541,970. Patented July 2, 1895.

Attest
Wm. T. Hall
W. C. Ourand

Inventor
Arthur J. Harder
by Walter Donaldson &c.
Attys.

UNITED STATES PATENT OFFICE.

ARTHUR J. HARDER, OF KINGSTON, PENNSYLVANIA.

DETACHABLE WATER-FILTERING BED.

SPECIFICATION forming part of Letters Patent No. 541,970, dated July 2, 1895.

Application filed September 21, 1894. Serial No. 523,749. (No model.)

*To all whom it may concern:*

Be it known that I, ARTHUR J. HARDER, a citizen of the United States, residing at Kingston, in the county of Luzerne and State of Pennsylvania, have invented certain new and useful Improvements in Filters, of which the following is a specification, reference being had therein to the accompanying drawings.

My invention relates to a combined cooler and filter and particularly to the improved construction of the filtering beds, in which the point of novelty resides in the detachable feature of these beds, whereby they may be readily removed and the filtering material cleansed or changed.

To this end the invention consists in a water chamber adapted to receive the water to be filtered resting upon a lower part, with the filtering chambers supported by said water chamber, so as to be accessible by lifting the water chamber from its support. The filtering compartments extend into the lower part of the water chamber and below this second chamber is a third chamber adapted to receive the filtered water and from which chamber it may be drawn by a faucet or cock.

Figure 1:
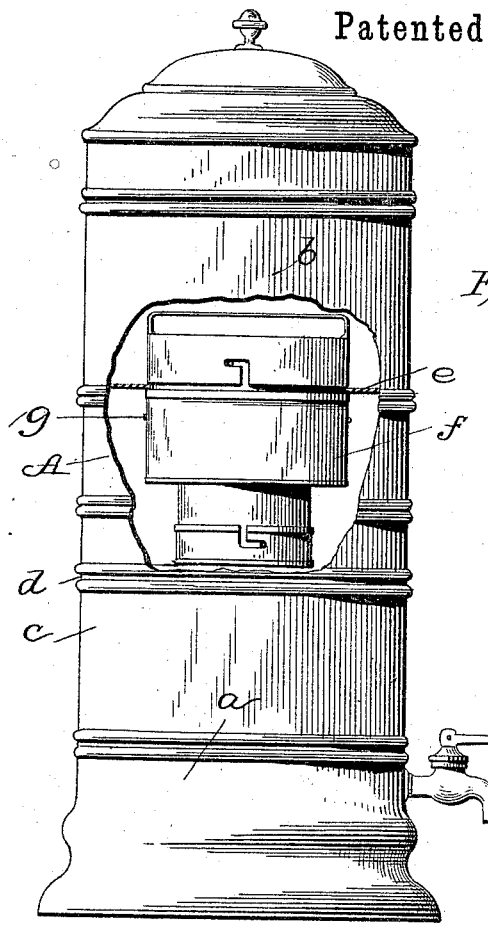
Figure 2:
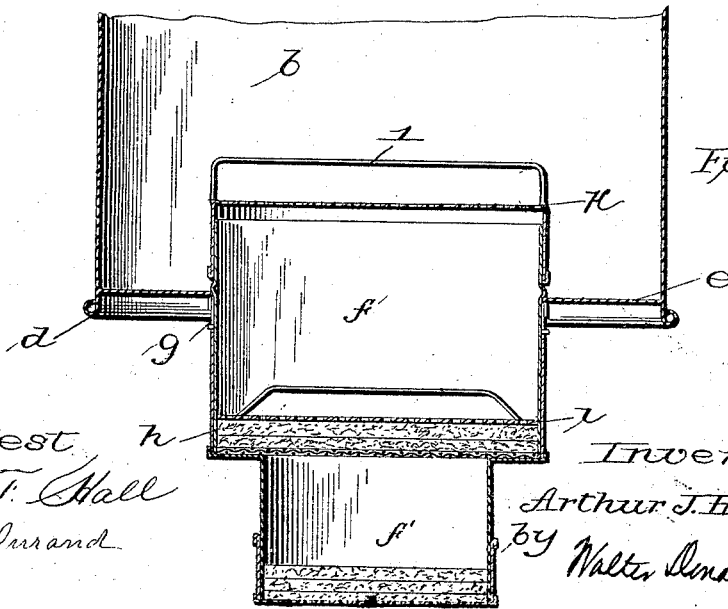

In the accompanying drawings, Figure 1 represents a side elevation of a cooler with my filter shown in section, a part of the casing being broken away for this purpose. Fig. 2 is a detail view in section of the water chamber and the filtering compartments.

In the drawings the cooler is shown at A and comprises a compartment for the filtered water $a$, a compartment for the water to be filtered $b$, and an intermediate compartment $c$. The lower compartment is not essential as the cock or faucet may if desired lead directly from the compartment $c$, and the only purpose of the lower compartment is to give greater capacity to the cooler. The upper compartment $b$ is detachably connected to the compartment $c$ at the point $d$ in any suitable manner. This compartment $b$ is preferably made of galvanized metal and has an independent bottom $e$ which practically forms an inwardly extending flange toward the center. A circular opening is left through the bottom of this compartment and securely soldered or otherwise fixed within this opening is an open ended cylinder $f$, which projects into the compartment and below the bottom of the same. One of the filtering chambers or beds forms the bottom of this cylinder and is removably connected to it by a bayonet joint connection $g$, the filtering chamber being shown at $h$ and comprises a cylindrical part with a bottom portion also provided with an opening in its center. Across this opening and resting upon the bottom of the filtering chamber is a wire gauze netting and upon this netting I place the filtering material to be used, which may be any of the well known materials, such as the felted materials used or the powdered materials as this may be left to the fancy of the user. In order to keep the materials in place, I place above them a perforated disk $i$, having a handle by which it may be readily lifted to remove or cleanse the filtering materials.

The upper end of the open ended cylinder is closed by a cover having a perforated top as shown at $k$, and having a handle $l$, the flange of this cover having a bayonet joint connection with the upwardly extending flange of the open ended cylinder. This perforated cap will prevent the passage of large impurities, and as the perforations are above the bottom of the water chamber, many of the heavier impurities will settle down into the recess around the covering cap.

From the bottom of the first filtering chamber $f$ extends a second chamber $f'$, open at the bottom but closed by a perforated cap, which is connected to the walls of the chamber by a bayonet joint connection. The second chamber may also contain suitable filtering material. It will thus be seen that I provide a chamber for the unfiltered water which is removably supported upon the cooler proper and that this chamber carries two filtering compartments, one of which is removably connected to the water chamber $d$ and the other removably connected to the first filter chamber, and this provides very simple means capable of easy access and of a ready removal for cleansing or other purposes of the filtering material contained therein.

The removable parts may be connected by screw-threads if desired instead of by the joints shown.

Having thus described my invention, what I claim, and desire to secure by Letters Patent, is—

In combination with a water chamber, an open ended cylinder extending through the bottom thereof, a perforated cap over the top of the cylinder, a filtering chamber removably connected to the lower part of said cylinder, a filtering chamber extending over the bottom of the first chamber, and a removable perforated cap covering the end of said cylinder, substantially as described.

In testimony whereof I affix my signature in presence of two witnesses.

ARTHUR J. HARDER.

Witnesses:
H. E. DODGE,
H. M. HINKLEY.